(12) United States Patent
Anders et al.

(10) Patent No.: US 10,452,891 B2
(45) Date of Patent: *Oct. 22, 2019

(54) MULTI-STEP SEQUENCE ALIGNMENT

(71) Applicant: Google LLC, Mountain View, CA (US)

(72) Inventors: Pedro Gonnet Anders, Zurich (CH); Filip Pavetic, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,713

(22) Filed: Apr. 30, 2018

(65) Prior Publication Data

US 2018/0247104 A1 Aug. 30, 2018

Related U.S. Application Data

(63) Continuation of application No. 15/251,347, filed on Aug. 30, 2016, now Pat. No. 9,959,448.

(60) Provisional application No. 62/377,421, filed on Aug. 19, 2016.

(51) Int. Cl.
*G06K 9/00* (2006.01)

(52) U.S. Cl.
CPC ..... *G06K 9/00087* (2013.01); *G06K 9/00758* (2013.01)

(58) Field of Classification Search
CPC ......... H04N 21/4722; H04N 21/23418; H04N 21/44008; H04N 21/812
USPC ....... 382/115, 116, 124, 126, 128, 209, 278; 340/5.81, 5.82, 5.83
See application file for complete search history.

(56) References Cited

U.S. PATENT DOCUMENTS

| | | | | |
|---|---|---|---|---|
| 7,194,116 B2* | 3/2007 | Du | ..................... | G06K 9/00026 382/124 |
| 7,212,658 B2* | 5/2007 | Du | ..................... | G06K 9/00026 382/115 |
| 7,251,372 B2* | 7/2007 | Wood | ................. | G06K 9/00067 341/50 |
| 7,336,841 B2* | 2/2008 | Neogi | ................ | G06K 9/00711 375/E7.089 |
| 7,346,512 B2 | 3/2008 | Li-Chun Wang et al. | | |
| 7,508,977 B2 | 3/2009 | Lyons et al. | | |

(Continued)

OTHER PUBLICATIONS

International Search report and Written Opinion dated Oct. 28, 2017 on application No. PCT/US2017/047646.

(Continued)

*Primary Examiner* — Yosef Kassa
(74) *Attorney, Agent, or Firm* — Lowenstein Sandler LLP

(57) ABSTRACT

A method of identifying similar media items is described. The method include identifying a first multiplicity of fingerprints representative of content segments of variable duration for a first media item and a second multiplicity of fingerprints representative of content segments of variable duration for a second media item. The method further includes comparing, by a processing device, a first group of the first multiplicity of fingerprints to a second group of the second multiplicity of fingerprints to generate a first similarity score indicative of a similarity between the first group of fingerprints and the second group of fingerprints. The method also includes determining an alignment score for the first multiplicity of fingerprints and the second multiplicity of fingerprints using the first similarity score.

20 Claims, 6 Drawing Sheets

(56) References Cited

U.S. PATENT DOCUMENTS

| | | | |
|---|---|---|---|
| 7,634,147 B2 * | 12/2009 | Neogi | H04N 19/467 382/245 |
| 7,653,921 B2 | 1/2010 | Herley | |
| 8,023,757 B2 * | 9/2011 | Neogi | H04N 19/467 382/245 |
| 8,027,565 B2 * | 9/2011 | Zhang | G06K 9/00758 386/241 |
| 8,212,135 B1 * | 7/2012 | Sharifi | G10H 1/00 84/609 |
| 8,335,789 B2 * | 12/2012 | Hull | G06F 21/78 707/736 |
| 8,425,301 B2 * | 4/2013 | Lyons | G07F 17/3265 463/16 |
| 8,428,301 B2 | 4/2013 | Radhakrishnan et al. | |
| 8,443,577 B2 * | 5/2013 | McWilliams | A61G 17/007 27/28 |
| 8,478,301 B2 | 7/2013 | Kohno et al. | |
| 8,635,211 B2 | 1/2014 | Jiang et al. | |
| 8,686,271 B2 | 4/2014 | Wang et al. | |
| 8,737,681 B2 | 5/2014 | Lahr et al. | |
| 8,816,179 B2 | 8/2014 | Wang | |
| 8,863,165 B2 | 10/2014 | Gordon | |
| 8,996,380 B2 | 3/2015 | Wang et al. | |
| 9,015,741 B2 | 4/2015 | Gordon | |
| 2010/0011392 A1 | 1/2010 | Bronstein et al. | |
| 2010/0104184 A1 | 4/2010 | Bronstein et al. | |
| 2015/0189193 A1 | 7/2015 | Kappeler et al. | |

OTHER PUBLICATIONS

Tahayna Bashar et al. "An efficient Method for Near-Duplicate Video Detection" Network and parallel computing: [lect. Notes computer], springer International publishing, Cham, vol. 5353 Chap. 39, No. 558, Dec. 9, 20058 (Dec. 9, 2008), pp. 377-389 Xp047397532.

Lamberto Ballan et al., "Video event classification using string kernels" Multimedia Tools and Applications, Kluwer Academic Publishers, Bo, vol. 48, No. 1, Sep. 15, 2009 (Sep. 15, 2009), pp. 69-87.

Needleman-Wunsch algorithm, Wikipedia 7 pages downloaded from https://en/wikipedia.org/wiki/Neelement%E2%80%93Wunsch_Algorithm on Jul. 1, 2016.

* cited by examiner

FIG. 3A — FIG. 3F

MULTI-STEP SEQUENCE ALIGNMENT

RELATED APPLICATIONS

The application is a continuation application of U.S. patent application Ser. No. 15/251,347, filed Aug. 30, 2016, which claims the benefit of U.S. Provisional Patent Application No. 62/377,421 filed Aug. 19, 2016, the entire contents of both are hereby incorporated by reference herein.

TECHNICAL FIELD

This disclosure relates to the field of content sharing platforms and, in particular, determining a similarity between media items.

BACKGROUND

Social networks connecting via the Internet allow users to connect to and share information with each other. Many social networks include a content sharing aspect that allows users to upload, view, and share content, such as video items, image items, audio items, and so on. Other users of the social network may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method identifying similar media items is disclosed. The method includes identifying a first multiplicity of fingerprints representative of content segments of variable duration for a first media item and a second multiplicity of fingerprints representative of content segments of variable duration for a second media item. The method further includes comparing a first group of the first multiplicity of fingerprints to a second group of the second plurality of fingerprints to generate a first similarity score indicative of a similarity between the first group of fingerprints and the second group of fingerprints. The first group of fingerprints includes at least two fingerprints representative of at least two content segments of variable duration of the first media item, and the second group of fingerprints includes at least one fingerprint representative of at least one content segment of variable duration of the second media item.

In another implementation, the first media item is a first video item, and wherein the second media item is a second video item.

In still another implementation, the method includes comparing a third group of the first multiplicity of fingerprints of the first media item to a fourth group of the second multiplicity of fingerprints of the second media item to generate a second similarity score indicative of a similarity between the third group of fingerprints and the fourth group of fingerprints. The alignment score is determined using the first similarity score and the second similarity score.

In an implementation, comparing the first group of the first multiplicity of fingerprints to the second group of the second multiplicity of fingerprints includes comparing a ratio between a duration of the first group of fingerprints and a duration of the second group of fingerprints to a duration threshold. If the ratio exceeds the duration threshold, the method generates the first similarity score indicative of the similarity between the first group of fingerprints and the second group of fingerprints. If the ratio does not exceed the duration threshold, the method refrains from generating the first similarity score indicative of the similarity between the first group of fingerprints and the second group of fingerprints.

In one implementation, comparing the first group of the first multiplicity of fingerprints to the second group of the second multiplicity of fingerprints includes determining a first sequence for the first multiplicity of fingerprints in view of time data for the first media item. The method also includes determining a second sequence for the second multiplicity of fingerprints in view of time data for the second media item. The method determines the first group of fingerprints by selecting a first fingerprint of the first sequence and one or more fingerprints of the first sequence that precede the first fingerprint in the first sequence. In another implementation, the method determines the second group of fingerprints by selecting a second fingerprint of the second sequence and one or more fingerprints of the second sequence that preceding the second fingerprint in the second sequence.

In another implementation, comparing the first group of the first plurality of fingerprints to the second group of the second plurality of fingerprints includes comparing each fingerprint in the first group of fingerprints to each fingerprint in the second group of fingerprints to generate a multiplicity of fingerprint pair similarity scores. The method also generates the first similarity score using the multiplicity of fingerprint pair similarity scores. The first similarity score is an average of the multiplicity of fingerprint pair similarity scores.

In additional implementations, one or more processing devices for performing the operations of the above described implementations are disclosed. Additionally, in implementations of the disclosure, a non-transitory computer readable storage medium stores instructions for performing the operations of the described implementations. Also in other implementations, systems for performing the operations of the described implementations are also disclosed

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
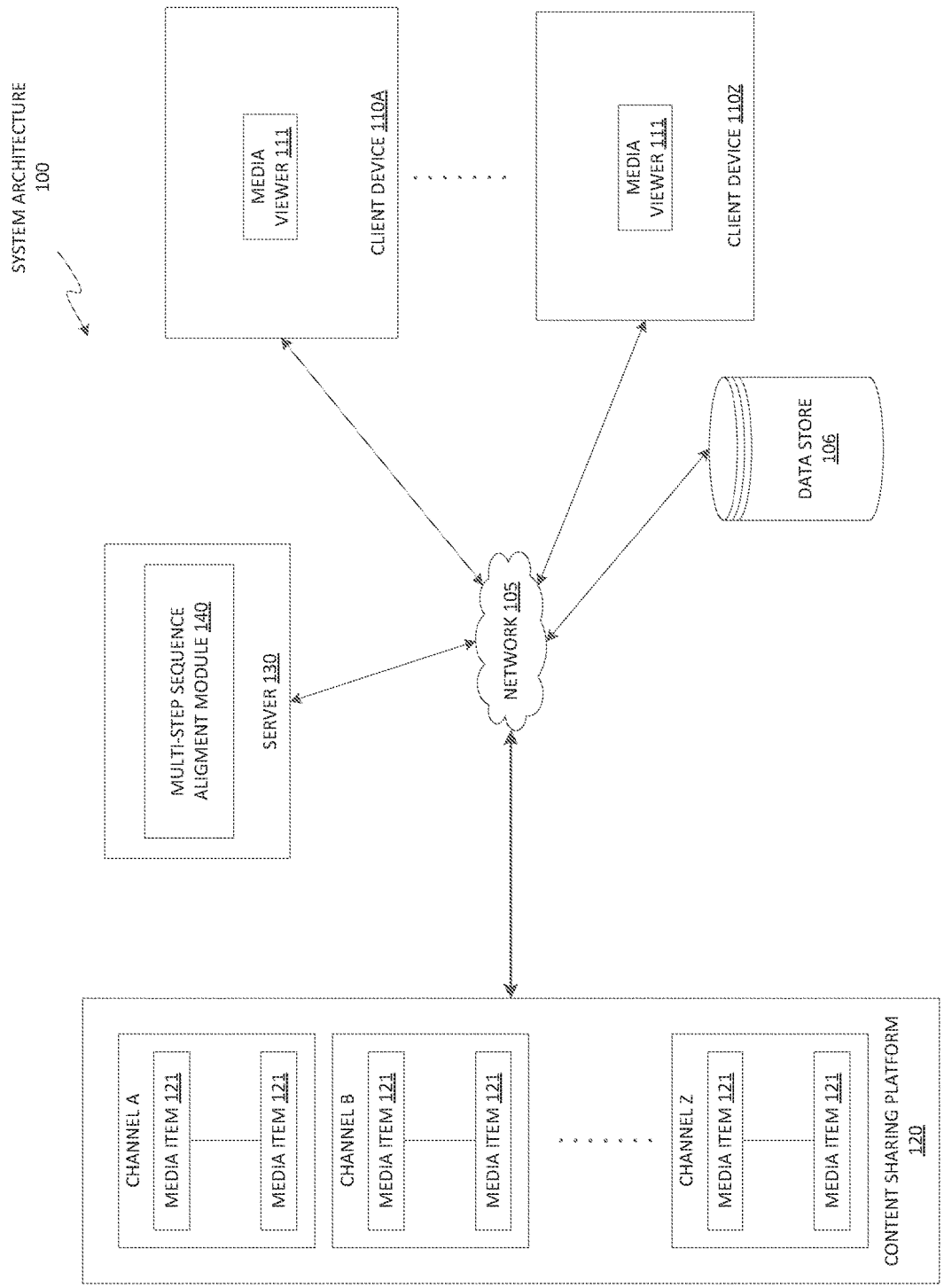
FIG. 1 illustrates an example system architecture, in accordance with one implementation of the disclosure

A media item, such as a video item (also referred to as "a video" or "video content"), may be uploaded to a content sharing platform by a video owner (e.g., a video creator or a video publisher) for consumption by users of the content sharing platform via their user devices. The video owner (who is also a user of the content sharing platform) may desire to prevent other users from uploading video items similar to the owner uploaded video item to the content sharing platform, or to impose some limitations on the use of the similar video items on the content sharing platform.

A user, other than the video owner, may upload another video item to the content sharing platform. The user uploaded video item may be scanned against a database of signatures such as fingerprints of various video items including a fingerprint of the owner uploaded video item, to determine if the user uploaded video item (e.g., probe video item) is similar to any video item (e.g., reference video item) represented in the database. If it is determined, based on the fingerprint scanning, that the user uploaded video item is similar or matches the owner uploaded video item, the video owner may decide what should happen to the user uploaded video item (e.g., whether it should be muted, blocked, removed, monetized, tracked, etc.). However, even if the user uploaded media item was derived from the owner uploaded video item, determining that the user uploaded media item is similar to the owner uploaded media item may present challenges because the user uploaded video item may not be an exact match with the owner uploaded video item. For example, the user may edit (e.g., add frames to, cut frames from, add content to, increase the playback speed of, etc.) owner uploaded content prior to uploading it to the content sharing platform.

In some systems, to determine if two media items (e.g., probe video item and reference video item) are similar, each of the media items may be transformed into a multiplicity of fingerprints where the fingerprints represent content segments of a fixed duration. For example, each fingerprint may represent a content segment of ¼ second of the media item. The fingerprints of the reference media item and the probe media item may be compared using single-step alignment techniques (e.g., Needleman-Wunsch or Smith-Waterman techniques) that match a single fingerprint of a fixed duration (e.g., ¼ second) of the reference media item to a single fingerprint of the same fixed duration (e.g., ¼ second) of the probe media item. Creating and storing fingerprints of media items representing content segments of fixed duration requires significant computational and storage resources, especially when dealing with large collections of media items. However, a media item may include significant portions of redundant and repetitive content (e.g., a video of a slideshow). The use of fingerprints that represent content segments of a fixed duration for media items containing redundant and repetitive content neither alleviates the impact on storage resources nor improves the ability to detect similar media items. Compared to fingerprints of fixed duration, fingerprints representative of content of variable duration (e.g., ¼ second to 10 seconds) may require less storage space at least because fewer fingerprints are used to represent a particular media item. However, conventional alignment techniques typically do not provide an effective solution for determining similarities between media items based on comparison of fingerprints representative of content segments of variable duration.

Aspects of the present disclosure address the above-mentioned and other deficiencies by determining similarities between media items using multi-step sequence alignment based on fingerprints of content segments of variable duration. Multi-step sequence alignment refers to performing a set of comparisons between different groups of fingerprints representing content segments of variable duration for two media items. As such, aspects of the present disclosure include identifying a first multiplicity of fingerprints representative of content segments of variable duration for a first media item and a second multiplicity of fingerprints representative of content segments of variable duration for a second media item. One or more groups of the first multiplicity of fingerprints are then compared to one or more groups of the second multiplicity of fingerprints to generate one or more similarity scores that are each indicative of a similarity between the corresponding groups of fingerprints. For example, a first group of the first multiplicity of fingerprints is compared to a second group of the second multiplicity of fingerprints to generate a first similarity score indicative of a similarity between the first group of fingerprints and the second group of fingerprints. The first group of fingerprints includes at least two fingerprints representative of at least two content segments of variable duration for the first media item, and the second group of fingerprints includes at least one fingerprint representative of at least one content segment of variable duration for the second media item. An alignment score is determined for the first multiplicity of fingerprints and the second multiplicity of fingerprints using the one or more similarity scores. The alignment score is indicative of a probability that the first media item is similar to the second media item. Similarity may be an agreement or correspondence in the details or features between two media items. The probability of similarity may be a measure of the likelihood that two media items are similar, where 100% probability of similarity may indicated that two media items are an exact match and 0% probability of similarity may indicate that two media items are completely dissimilar.

Accordingly, aspects of the present disclosure allow for a group of one or more fingerprints representing variable length content segments of a media item to be compared to another group of one or more fingerprints representing variable length content segments of another media item so that a similarity score indicative of the similarity between the two groups may be generated. Similarity scores for multiple groups of fingerprints for the two media items may be generated and used to make a determination of the probability that the two media items are similar. As compared to using single-step alignment of fingerprints of fixed duration content segments, multi-step sequence alignment provided by the aspects of the present disclosure results in significant reduction of storage resources and significant reduction of computational (processing) resources because multi-step sequence alignment processes fingerprints of content segments of variable duration and the number of such fingerprints that is needed to represent a media item is much lower than the number of fingerprints of fixed duration content segments. Moreover, multi-step sequence alignment provided by the aspects of the present disclosure substantially improves the identification of two similar media items because the multi-step sequence alignment processes different combinations of groups of fingerprints representing content segments of variable length, and thereby provides a more accurate result.

It may be noted that for purposes of illustration, rather than limitation, the following description describes performing multi-step sequence alignment on video items. It may also be noted that multi-step sequence alignment may be performed on various data objects other than video items or media items.

For purposes of clarity and simplicity, the term "probe media item" may refer to a media item (e.g., an electronic file of a media item). For example, a probe video item refers to a video item. The term "probe" may refer to the fingerprints of the probe media item Likewise, the term "reference media item" may refer to another media item. For example, a reference video item refers to another video item. The term "reference" may refer to the fingerprints of the reference media item.

FIG. 1 illustrates an example system architecture 100, in accordance with one implementation of the disclosure. The system architecture 100 includes client devices 110A through 110Z, a network 105, a data store 106, a content sharing platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In one implementation, data store 106 stores media items, such as video items, and/or fingerprints representative of content segments of variable duration for the media items. Fingerprints representative of content segments of variable duration may be referred to herein as "fingerprints."

The client devices 110A through 110Z may each include computing devices such as personal computers (PCs), laptops, mobile phones, smart phones, tablet computers, netbook computers, network-connected televisions, etc. In some implementations, client devices 110A through 110Z may also be referred to as "user devices." Each client device includes a media viewer 111. In one implementation, the media viewers 111 may be applications that allow users to view or upload content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), disapprove of ("dislike"), and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet and/or via a mobile device application. For brevity and simplicity, a video item is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items and/or fingerprints as electronic files in one or more formats using data store 106.

In one implementation, the server 130 may be one or more computing devices (e.g., a rackmount server, a server computer, etc.). In one implementation, the server 130 may be included in the content sharing platform 120. The server 130 may include a multi-step sequence alignment module 140. The multi-step sequence alignment module 140 enables the multi-step sequence alignment of fingerprints of media items to determine if two media items are similar as described in the disclosure. In some implementations, the multi-step sequence alignment module 140 may generate fingerprints for a media item. Alternatively, client device 110A-110Z may include a client-side fingerprint generator (not shown) that enables the generation of fingerprints for a media item. Client-side fingerprint generator may perform implementations of the disclosure independently of multi-step sequence alignment module 140 of server 130, or may work in conjunction with multi-step sequence alignment module 140. Although the following description may refer to multi-step sequence alignment module 140 performing implementations of the disclosure, it may be understood that functionality of multi-step sequence alignment module 140 may be similarly performed solely by, and/or in conjunction with, client-side fingerprint generator at client device 110A-110Z.

In one implementation, user content may include a video item. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example. In one implementation, fingerprints of a video item may be fingerprints of the video component of the video item. In other implementations, fingerprints of a video item may be fingerprints of the audio component of the video item. In yet other implementations, fingerprints of a video item may be fingerprints of both the video component and audio component of the video item.

In one implementation, a user may upload a media item, such as a video item, via client device 110A. The uploaded video item may be stored in data store 106. Multi-step sequence alignment module 140 may generate a multiplicity of fingerprints for the uploaded video item (e.g., probe video item) received by the user. Each of the multiplicity of fingerprints may represent different content segments of variable length of the probe video item. The multiplicity of fingerprints of the probe video item may be stored at data store 106. Fingerprints for other video items of content sharing platform 120 may be generated by multi-step sequence alignment module 140 or received from client device 110. Fingerprints for the video items of content sharing platform 120 may be stored at data store 106.

In one implementation, multi-step sequence alignment module 140 may perform multi-step sequence alignment between fingerprints of the uploaded video item (e.g., probe video item) and fingerprints of one or more of the previously-uploaded video items (e.g., reference items) of content sharing platform 120. Multi-step sequence alignment module 140 may identify a sequence of fingerprints for the probe video item stored at data store 106 and identify a sequence of fingerprints for each reference video item also stored at data store 106. Multi-step sequence alignment module 140 may compare a group of one or more fingerprints from the sequence of fingerprints of the probe video item to a group of one or more fingerprints from the sequence of fingerprints of the reference video item and generate a first similarity score based on the comparison. The similarity score is indicative of the similarity between the group of fingerprints of the probe video item and the group of fingerprints of the reference video item. Each of the groups includes one or more fingerprints representative of one or more content segments of variable duration for a corresponding media item. For instance, the group of fingerprints for the probe video items may contain three fingerprints and the group of fingerprints for the reference video item may contain two fingerprints. Additional groups of fingerprints for the probe video item and the reference video item may then be determined and compared, until the entire sequence of fingerprints for the probe video item is compared to the entire sequence of fingerprints for the reference video item. Additional similarity scores may be generated from the comparison of the additional groups. An alignment score may be generated using multiple similarity scores for different groups of fingerprints. The alignment score describes how well the sequence of fingerprints for the probe video item is aligned with the sequence of fingerprints for the reference video item and is indicative of a probability that the probe video item is similar to the reference media item. In some implementations, if the alignment score exceeds a threshold alignment score the probe video item may be considered similar to the reference video item and the owner of the reference video item may be notified (e.g., a message may be sent to the owner's client device). The threshold alignment score may be determined by an administrator, server 130, or otherwise.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
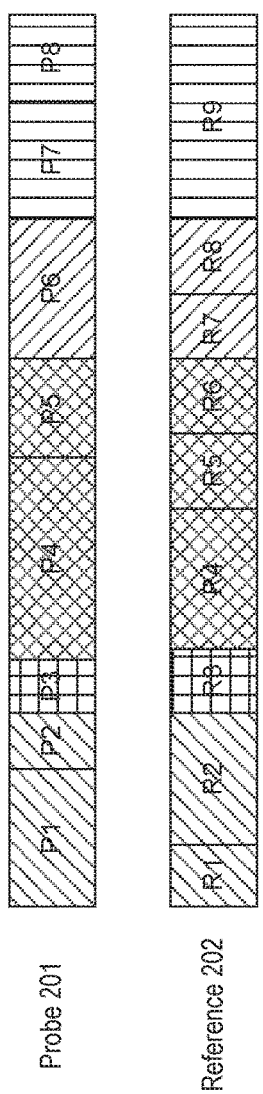
FIG. 2 is an example pair of fingerprint sequences used by the multi-step sequence alignment module, in accordance with an implementation of the disclosure.

FIG. 2 is an example pair of fingerprints sequences used by the multi-step sequence alignment module, in accordance with an implementation of the disclosure. Fingerprint sequence pair 200 includes probe 201 and reference 202. In one implementation, probe 201 illustrates a sequence of multiple fingerprints representative of content segments of variable duration associated with a media item (e.g., probe media item). Reference 202 illustrates a sequence of fingerprints representative of content segments of variable duration associated with another media item (e.g., reference media item). In some implementations, a fingerprint may refer to a signature of a first data item (e.g., the first media item or a content segment of the first media item) that may uniquely identify the first data item, and that can be mapped to a signature of a second data item (e.g., the second media item or a content segment of the second media item) that may uniquely identify the second data item. In some examples, a media item or a content segment of a media item may be input into a fingerprint function (e.g., a hash function) to generate a fingerprint representative of the media item or content segment, respectively. In some implementations, a media item may be transformed into a sequence of multiple fingerprints where each fingerprint is representative of a different content segment of the media item. In some implementations, each of the sequence of fingerprints represents a different non-overlapping content segment of the media item.

Probe 201 includes fingerprints P1 through P8. Reference 202 includes fingerprints R1 through R9. Each of the fingerprints of probe 201 and reference 202 is representative of a different content segment of the associated media item (e.g., probe media item or reference media item, respectively). In some implementations, the fingerprints P1 through P8 are fingerprints representative of all or a majority of the content of probe media item. In some implementations, fingerprints R1 through R9 are fingerprints representative of all or a majority of the content of reference media item.

In some implementations, each of probe 201 and reference 202 may be ordered as a sequence based on time data associated with the fingerprints of probe 201 and reference 202. The time data may be, for example, a start timestamp and end timestamp of the content segment. For example, fingerprints P1 through P8 of probe 201 may be representative of sequential content segments of probe video item. P1 may represent a content segment with start timestamp and end timestamp of 0 seconds and 1 second respectively, P2 may represent a content segment with start timestamp and end timestamp of 1 second and 1.4 seconds respectively, P3 may represent a content segment with start timestamp and end timestamp 1.4 seconds to 1.7 seconds respectively, and so forth. In some implementations, the time data may be associated with the fingerprint (e.g., using the metadata) or be part of the fingerprint itself.

In some implementations, the varying length of fingerprints of probe 201 and reference 202 illustrates a relative duration of the content segments for the respective fingerprints. For example, the length of fingerprint P1 of probe 201 represents that the content segment represented by fingerprint P1 is over two times the duration of content segment represented by fingerprint P2. In another example, the length of fingerprint P2 of probe 201 represents that the content segment represented by fingerprint P2 is less than half the duration of the content segment represented by fingerprint R2 of reference 202. As illustrated by a variable length, the fingerprints of probe 201 and reference 202 represent content segments of variable duration. A total duration of the content segments represented by a group of fingerprints may be a combination of the durations of individual content segments in the group. For example, the total duration of the content segments for the group of fingerprints P1 and P2 is the duration (e.g., length) of P1 in addition to the duration (e.g., length) of P2. The total duration of P1 and P2 is similar to the total duration of R1 and R2. In some implementations, the duration of the content segment that may be stored as data associated with the corresponding fingerprint (e.g., in the metadata) or be part of the fingerprint itself. In some implementations, timestamps may be used to determine a duration of a particular fingerprint. For example, the start timestamp may be subtracted from the end timestamp to determine a duration (e.g., x seconds) of the content segment represented by a fingerprint.

In FIG. 2, the shading within each of fingerprints P1-P8 of probe 201 and fingerprints R1-R9 of reference 202 illustrates groups of fingerprints between the probe 201 and reference 202 that are significantly similar (e.g., a similarity score indicating a high similarity between the groups). For example, the group of fingerprints including P1 and P2 of probe 201 is similar to the group of fingerprints R1 and R2 of reference 202. The group of fingerprints P3 is similar to the group of fingerprints R3. The group of fingerprints P4 and P5 is similar to the group of fingerprints R4, R5, and R6. The group of fingerprints P6 is similar to the group of fingerprints R7 and R8. The group of fingerprints P7 and P8 is similar to the group of fingerprints R9. A group of fingerprints may include 1 or more fingerprints. It may be noted that although fingerprints P3 and R3 are similar, the fingerprints may not be of the same duration (e.g., length). It may be noted that some groups of fingerprints may be of a similar total duration (e.g., group P1 and P2 compared to R1 and R2) but the content segments represented by the fingerprints may have been partitioned differently (e.g., the timestamps of the fingerprints are different). It may be noted that some groups of fingerprints may be similar even though the number of fingerprints in each groups may not match (e.g., P4 and P5 compared to R4, R5, and R6).

In FIG. 2, the matched shading between groups of fingerprints of probe 201 and groups of fingerprints of reference 202 represent groups having the most similarity (e.g., maximum similarity score). In some implementations, groups of different combinations of fingerprints may be created (e.g., iteratively or recursively) for each position (e.g., [R2, P2]) along the probe 201 and reference 202. Each of the pairs of groups (e.g., a pair of a group for probe 201 and a group for reference 202) at a particular position may be used to generate a similarity score. A maximum similarity score may be selected from similarity scores for different pairs of groups to identify a pair of groups for probe 201 and reference 202 that are the most similar.

For example, at positions P2 and R2 four different groups may be formed that each includes at least fingerprints P2 and R2. The groups at position P2 and R2 may also include fingerprints that precede P2 or R2. The groups may be as follows {group of fingerprints for reference 202/group fingerprints for probe 201}: {R2/P2}, {R2/P2, P1}, {R2, R1/P2}, and {R2, R1/P2, P1}. Each of the four pairs of groups may be used to generate a similarity score. The maximum similarity score may be selected that represents a pair of groups (e.g., {R2, R1/P2, P1}) that are the most similar. Some aspects of determining the maximum similarity score are discussed in greater detail below in conjunction with FIG. 3D-3E.

Further, in some implementations, the alignment score may be determined by combining the maximum similarity scores for all the pairs of groups (e.g., {R2, R1/P2, R1}, {R3, P3}, {R6, R5, R4/P5, P4}, {R8, R7/P6}, {R9/P8, P7}. As illustrated in FIG. 2, the matching of all the pairs of groups for the probe 201 and reference 202 represents the best alignment between probe 201 and reference 202.

In some implementations, probe 201 and reference 202 may be used an input for multi-step sequence alignment module 140 of FIG. 1 and used to determine the probability that probe video item is similar to reference video item. It may be noted that probe 201 or reference 202 may include any number of fingerprints.

It may be noted that implementations of the present disclosure describe using fingerprints of media items for purposes of illustration, rather than limitation. It may be noted that multi-step sequence alignment is not restricted to fingerprints, much less fingerprints of media items. For example, multi-step sequence alignment may be used with the content segments themselves (e.g., input), rather than fingerprints. It may be further noted that multi-step sequence alignment may be performed on any inputs where at least some inputs (e.g., fingerprints or content segments) do not match on a strict 1:1 basis (e.g., the length or duration of the inputs are not same). For example, multi-step sequence alignment may be used to compare groups of multiple amino acids and nucleotides of a first DNA strand to other groups of multiple amino acids and nucleotides of a second DNA strand to determine a probability the DNA strands are similar.

In another implementation, multi-sequence alignment may be used to compare fingerprints of two audio clips to determine if the two audio items are similar. In still another implementation, the multi-step sequence alignment may be used to compare two melodies to determine if the two melodies are similar. A melody may be data, such as a chord progression, sufficient to recognize a song. For example, two melodies may be considered similar (e.g., alignment score exceeds a threshold) if the two melodies have roughly the same transitions between notes at roughly the same times. Melodies played at different pitches or speeds may be considered similar. Additionally, melodies may be considered similar even when one of the melodies has added a few notes or harmonics.

Figure 3:
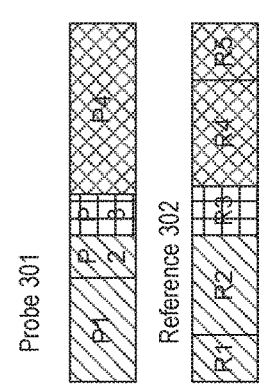
FIG. 3A is an example of two fingerprint sequences used by the multi-step sequence alignment module, in accordance with another implementation of the disclosure.
FIGS. 3B-3F illustrate multi-step sequence alignment using the two fingerprint sequences of FIG. 3A, in accordance to some implementations of the disclosure.

FIG. 3A is an example of fingerprint sequences used by the multi-step sequence alignment module, in accordance with another implementation of the disclosure. Multi-step sequence alignment module 140 of FIG. 1 may perform all or some of the operations described with respect to FG 3A. Probe 301 illustrates a sequence of multiple fingerprints representative of content segments of variable duration associated with a media item (e.g., probe media item). Reference 302 illustrates a sequence of multiplicity of fingerprints representative of content segments of variable duration associated with another media item (e.g., reference media item). Probe 301 and reference 302 may be similar to probe 201 and reference 202 as described with respect to FIG. 2. The fingerprints P1 through P4 of probe 301 are ordered in a sequential order in view of time data (e.g., timestamps) for the probe media item, where fingerprints associated with earlier timestamps (e.g., P1) are order before fingerprints associated with older timestamps (e.g., P2 through P4). Fingerprints R1 through R5 of reference 302 are also ordered in a sequential order in view of time data for the reference media item.

FIGS. 3B-3F illustrate multi-step sequence alignment using the fingerprint sequences of FIG. 3A, in accordance to some implementations of the disclosure. Multi-step sequence alignment module 140 of FIG. 1 may perform all or some of the operations described with respect to FIGS. 3B-3F. As illustrated in FIG. 3A, probe 301 (e.g., size X) includes four fingerprints and reference 302 (e.g., size Y) includes five fingerprints.

As illustrated in FIG. 3B, multi-step sequence alignment module 140 may create a matrix 300 of size X+1 columns by Y+1 rows that correspond to the size of probe 301 and reference 302. An extra row and extra column may be introduced to provide a starting point for alignment (e.g., matrix position [0, 0]). The columns of matrix 300 are associated with fingerprints P1 though P4 in sequence order. The rows of matrix 300 are associated with fingerprints R1 through R5 in sequence order. Position in the matrix is expressed as matrix position [row, column].

As shown in FIG. 3C, matrix 300 is initialized with some similarity scores. Matrix position [0, 0] is initialized with a similarity score of 0 and acts as a starting point for aligning probe 301 and reference 302. The first row (e.g., row 0) and first column (column 0) may be initialized with a low similarity score, such as negative infinity, indicating no similarity between the corresponding fingerprints in the row and the column. Since there are no fingerprints corresponding to row 0, there is no similarity for any of the groups of fingerprints (P1 through P4) for row 0. Similarly, since there are no fingerprints corresponding to column 0, there is no similarity for any of the groups of fingerprints (R1 through R5) for column 0.

In some implementations, prior to calculating a similarity score, a duration constraint may be applied to some or all pairs of groups at a matrix position. A duration constraint may be enforced to ensure that aligned pairs of fingerprint groups roughly represent content segments with the same total duration. For instance, a ratio between a total duration of content segments represented by a group of fingerprints of the probe 301 and a total duration of content segments represented by a group of fingerprints of the reference 302 may be compared to a duration threshold. If the ratio is below the duration threshold (e.g., 0.5), the groups of fingerprints are not compared for similarity because the two groups represent content segments of very different total duration. A value, such as negative infinity, may be assigned as a similarity score if the ratio is below the duration threshold. If the ratio is greater or equal to the duration threshold, a similarity score may be calculated for the groups of fingerprints.

For example, matrix position [R1, P1] illustrates the enforcement of a duration constrain. The ratio between the shortest fingerprint R1 (e.g., length representing duration of the associated content segment) and the longest fingerprint P1 is approximately 0.35 which is less than a duration threshold of 0.5. The duration constrain is enforced and a similarity score of negative infinity is populated to matrix position [P1, R1]. In one implementation, the duration threshold may be any number between 0 and 1 and may be chosen by an administrator.

In one implementation, the duration constraint may be expressed as:

$$\frac{\min(\text{time } [i-k \ldots i], \text{time } [j-l \ldots j])}{\max(\text{time } [i-k \ldots i], \text{time } [j-l \ldots j])} \gtrsim \text{duration threshold (e.g, 0.5)}$$

$$\frac{\min(\text{time } [i-k \ldots i], \text{time } [j-l \ldots j])}{\max(\text{time } [i-k \ldots i], \text{time } [j-l \ldots j])} \gtrsim \text{duration threshold (e.g, 0.5)}$$

The above equation defines the ratio as a minimum/maximum correspondence, where the dividend of the ratio is the minimum total duration of a group of fingerprints for a set of groups. The set of groups includes a group of fingerprints for probe 301 and a group of fingerprints for reference 302. The divisor of the ratio is the maximum total duration of a group of fingerprints for a set of groups. The set of groups includes a group of fingerprints for probe 301 and a group of fingerprints for reference 302. It may be noted that determining the set of groups may be recursive (e.g., [j−k . . . i]) to ensure that all the combinations of groups are checked against the duration constraint. "i" represents the fingerprint in the $i^{th}$ position in the row and "j" represents the fingerprint in $j^{th}$ position in the column. "k" represents a number of fingerprints included in a group of fingerprints for reference 302, where the group includes at least the fingerprint in the $i^{th}$ position and each preceding fingerprint up to the $k^{th}$ position in the sequence of fingerprints for reference 302. "k" may define a neighborhood of fingerprints to include in a group of fingerprints for reference 302. "l" represents a number of fingerprints included in the group of fingerprints for probe 301, where the group includes the fingerprint in the $j^{th}$ position and each preceding fingerprint up to the $l^{th}$ position in the sequence of fingerprints for probe 301. "l" may define a neighborhood of fingerprints to include in a group of fingerprints for probe 301. "k" and "l" may be any integer number, and be different numbers. "k" and "l" may be determined by an administrator. "k" and "l" may be in a range of a search space specified by an administrator, for example. The search space may be on the order of 10 to 15 fingerprints, for example. It may be noted that the search space may be any number. The ratio may be computed for each pair of values for "k" and "l" inside the specified search space. "Time" represents the total duration of content segments for a group of fingerprints, the group defined by fingerprints [i−k . . . i], for example.

As shown in FIG. 3D, a maximum similarity score (e.g., 0.8) for the matrix position [R2, P2] is recorded. According to some implementations, determining the maximum similarity score involves identifying a group of fingerprints of probe 301 (e.g., P1 and P2) and a group of fingerprints of reference 302 (e.g., R1 and R2). A group of fingerprints for the reference 302 may be identified by selecting a fingerprint in the sequence of fingerprints in the $i^{th}$ position in the row (e.g., R2), and including one or more fingerprints (e.g., R1) directly preceding the selected fingerprint. The group of fingerprints for the reference 302 may include R1 and R2, for example. Similarly, a group of fingerprints for the probe 301 may be identified by selecting a fingerprint in the sequence of fingerprints in the $j^{th}$ position in the column (e.g., P2), and including one or more fingerprints (e.g., P1) directly preceding the selected fingerprint. The group of fingerprints for the probe 301 may include P1 and P2, for example.

In one implementation, after the fingerprint groups have been identified a group for the probe 301 and a group for the reference 302, the fingerprint groups may be compared to the duration constraint. The ratio between the total duration of the content segments associated with the group of fingerprints for probe 301 (e.g., total length of P1 and P2) and the total duration of the content segments associated with the group of fingerprints for reference 302 (e.g., total length of R1 and R2) may be compared to the duration threshold (e.g., 0.5). For example, the ratio of the total duration of P1 and P2 and the total duration of R1 and R2 is approximately 1, which exceeds the duration threshold of 0.5. Because the duration constraint has been met, the similarity score may be calculated for the groups of fingerprints.

In one implementation, a similarity score for the group of fingerprints for probe 301 (P1 and P2) and the group of fingerprints for reference 302 (R1 and R2) may be determined by generating a fingerprint pair similarity score for each fingerprint in the group of fingerprints for probe 301 (P1 and P2) compared with each fingerprint in the group of fingerprints for reference 302 (R1 and R2) (e.g., 1 fingerprint from the probe group to 1 fingerprint from the reference group). The multiple fingerprint pair similarity scores may be aggregated to generate a single similarity score for the fingerprint groups being compared. In one implementation, the similarity score may be the average of the multiple fingerprint pair similarity scores.

For example, for the group of fingerprints for probe 301 (P1 and P2) and the group of fingerprints for reference 302 (R1 and R2), a fingerprint pair similarity score may be generated for each of the following pairs of fingerprints, (R1, P1), (R1, P2), (R2, P1), (R2, P2). Since there are 2 fingerprints in each group, four fingerprint pair similarity scores may be generated. For example, a fingerprint pair similarity score for the following fingerprint pairs may be generated (R1, P1)=0.9, (R1, P2)=0.8, (R2, P1)=0.7, (R2, P2)=0.8. In another example, if one group has 4 fingerprints and another group has 2 fingerprints, a total of 8 (4×2) fingerprint pair similarity scores may be generated. To generate a single similarity score for the two groups using the multiple fingerprint pair similarity scores, an average of the fingerprint pair similarity scores may be determined. For example, the average of the fingerprint pair similarity scores may be found by summing the fingerprint pair similarity scores and dividing the sum by the total number of fingerprint pairs (e.g., similarity score=(0.9+0.8+0.7+0.8)/4 pairs=0.8).

For sake of simplicity, a single similarity score for matrix position [R2, P2] has been described. It may be noted that different groups of fingerprints may be determined for matrix position [R2, P2], as described at least with respect to FIG. 2. For each of the different pairs of groups for a particular matrix position, a similarity score may be determined and a maximum similarity score selected from the determined similarity scores.

In one implementation, a fingerprint pair similarity score may be obtained for each pair of fingerprints in the two groups by using a similarity function (e.g., similarity [ii, jj]). A similarity function quantitatively measures the similarity between two items. In one example, a pair of fingerprints (e.g., [P1, R1]) may be used as input for a similarity function. The similarity function may output a value indicative of the similarity between the two fingerprints. A similarity function may output a fingerprint pair similarity score between 0 and 1, where 1 is most similar and 0 is least similar. It may be noted that any number of similarity functions may be implemented such as the Euclidean ($L_2$) distance between two fingerprints represented as vectors, cosine distance between two fingerprints represented as vectors, Kendall-Tau distance, or Hamming distance, for example.

In another implementation, the similarity score may be defined by the following equation:

$$\text{similarity score } [i-k \ldots i, j-l \ldots j] = \\ \text{score}\left(\frac{\text{sum(similarity } [ii \ldots jj], ii = i-k \ldots i, jj = j-l \ldots j)}{k*l}\right) * \\ \min(k, l)$$

It may be noted that the similarity score includes recursive elements to find multiple similarity scores for a given matrix position. The similarity function is expressed as similarity [ii, jj]. The similarity function may produce fingerprint pair similarity scores. The sum of the fingerprint pair similarity scores (e.g., sum(similarity [ii, jj])) may be obtained. The sum of the fingerprint similarity scores can be divided by the total number of fingerprint pairs in the two groups (e.g., k*1) to produce the average of the fingerprint pair similarity scores. "k" represents a number of fingerprints included in a group of fingerprints for reference 302 and "l" represents a number of fingerprints included in a group of fingerprints for probe 301. In some implementations, the average of the fingerprint pair similarity scores may be multiplied by a factor to prevent from maximizing the similarity score in non-matching regions by aligning large non-matching. In one implementation, in an unweighted scheme (e.g., without scaling using the factor) the similarity score will skip over large stretches of non-matching fingerprints in large chunks. The non-matching fingerprints produce a bad score, but the influence on the total score is kept low by taking fewer large steps. In one implementation, the factor may include min(k, l) which is the minimum number of fingerprints for a group from a set of groups including the group of fingerprints for reference 302 (e.g., R1 and R2) and the group of fingerprints for probe 301 (e.g., P1 and P2)). It may be appreciated that other factors may be used.

It may be noted that the arrow from matrix position [R2, P1] points back to matrix position [0, 0]. The arrow indicates that matrix position [0, 0] is a jump point or a start point for the group. The arrow also indicates the fingerprints contained in each group. For example, the arrow indicates that the two groups for matrix position [R2, P2] include P1 and P2 for the probe 301 and R1 and R2 for the reference 302. The arrow also indicates that the two groups start at matrix position [0, 0]. The similarity score (0.8) for the group of fingerprints is added to the similarity score at the jump point (e.g., 0+0.8=0.8).

In one implementation, and as described above, determining a similarity score for a particular matrix position may include finding a maximum similarity score for groups of fingerprints that contain different combinations of fingerprints. For instance, for matrix position [P2, R2], four different groups may be formed that each includes at least P2 and R2. The groups at position P2 and R2 may also include fingerprints that precede P2 or R2 in these groups. The groups may be as follows {group of fingerprints for reference 201/group fingerprints for probe 201}: {R2/P2}, {R2/P2, P1},{R2, R1/P2}, and {R2, R1/P2, P1}. The pair of groups {R2/P2} is compared to the duration constraint. The pair of groups {R2/P2} fails the duration constraint and is assigned a similarity score of negative infinity. The pair of groups {R2/P2, P1} is compared to the duration constraint. The pair of groups {R2/P2, P1} meets the duration constraint and receives a similarity score of 0.6. The pair of groups {R2, R1/P2} is compared to the duration constraint. The pair of groups {R2, R1/P2} fails the duration constraint and is assigned a similarity score of negative infinity. The pair of groups {R2, R1/P2, P1} is compared to the duration constraint. The pair of groups {R2, R1/P2, P1} meets the duration constraint and receives a similarity score of 0.8. The maximum similarity score may be selected from the resulting values {−∞, 0.6, −∞, 0.8}. The maximum similarity score for the matrix position [R2, P2] is 0.8 for a pair of groups {R2, R1/P2, P1}. As noted above, for all or some of the matrix positions, a maximum similarity score may be determined as described above.

In one implementation, the finding of the maximum similarity score for a matrix position may be expressed in the following maximization equation:

$$M[i,j]=\max \{M[i-k, j-l]+\text{similarity score}[i-k \ldots i, j-l \ldots j] \text{ for } k \text{ and } l \text{ in } 1 \ldots N, 0\}$$

It may be noted that the above maximization equation includes recursive elements (e.g., similarity score [i−k . . . i, j−l . . . j]). In the above maximization equation, multiple similarity scores for groups with different combinations of fingerprints are calculated, and the maximum similarity score is selected.

As shown in FIG. 3E, matrix 300 is filled with maximum similarity scores for various pairs of groups. For instance, for matrix position [R3, P3], the highest similarity score is between the pair of groups {R3/P3}. The highest similarity score for matrix position [R3, P3] may be 0.9. The highest similarity score may be added to the similarity score from the jump point (e.g., matrix position [R2, P2]). For example, a similarity score of 0.8 from matrix position [R2, P2] is added to the maximum similarity score 0.9 at matrix position [R3, P3].

As described above, determining a similarity score for a matrix position [R3, P3] may include finding a maximum similarity score for groups of fingerprints that contain different combination of fingerprints. For instance, for matrix position [R3, P3] multiple groups, each including at least R3 and P3 are compared. The compared groups may include the following combinations: {R3/P3}, {R3/P3, P2}, {R3/P3, P2, P1}, {R3, R2/P3}, {R3, R2/P3, P2}, {R3, R2/P3, P2, P1}, {R3, R2, R1/P3}, {R3, R2, R1/P3, P2}, and {R3, R2, R1/P3, P2, P1}.

As shown in FIG. 3F, multiple alignment scores are determined. For instance, matrix position [R5, P4] has the highest alignment score of 2.6. Matrix position [R4, P4] has the second highest alignment score of 2.0. In one implementation, the alignment score is determined by adding the similarity scores (e.g., maximum similarity scores) as recorded in jump points in matrix 300. For example, the alignment score of 2.6 at [R5, P4] is calculated with the sum 0 [0, 0]+0.8 [R2, P2]+0.9 [R3, P3]+0.9 [R5, P4]=2.6. The highest alignment score may provide the optimum alignment for the two sequences of fingerprints (e.g., probe 301 and reference 302). The optimum alignment is illustrated in FIG. 3A.

The alignment score is indicative of a probability that a first media item (e.g., reference media item) is similar to another media item (e.g., reference media item). In one implementation, the alignment score is compared to a threshold alignment score. The threshold alignment score may be determined empirically such that recall is maximized, i.e., maximize the number of matching videos identified, but keep the number of false positives below a certain threshold (e.g., false positive rate such as 5%). If the alignment score is equal to or greater than the threshold alignment score, the two media items may be considered similar. If the alignment score is less than the threshold alignment score, the two media items may not be considered similar.

Figure 4:
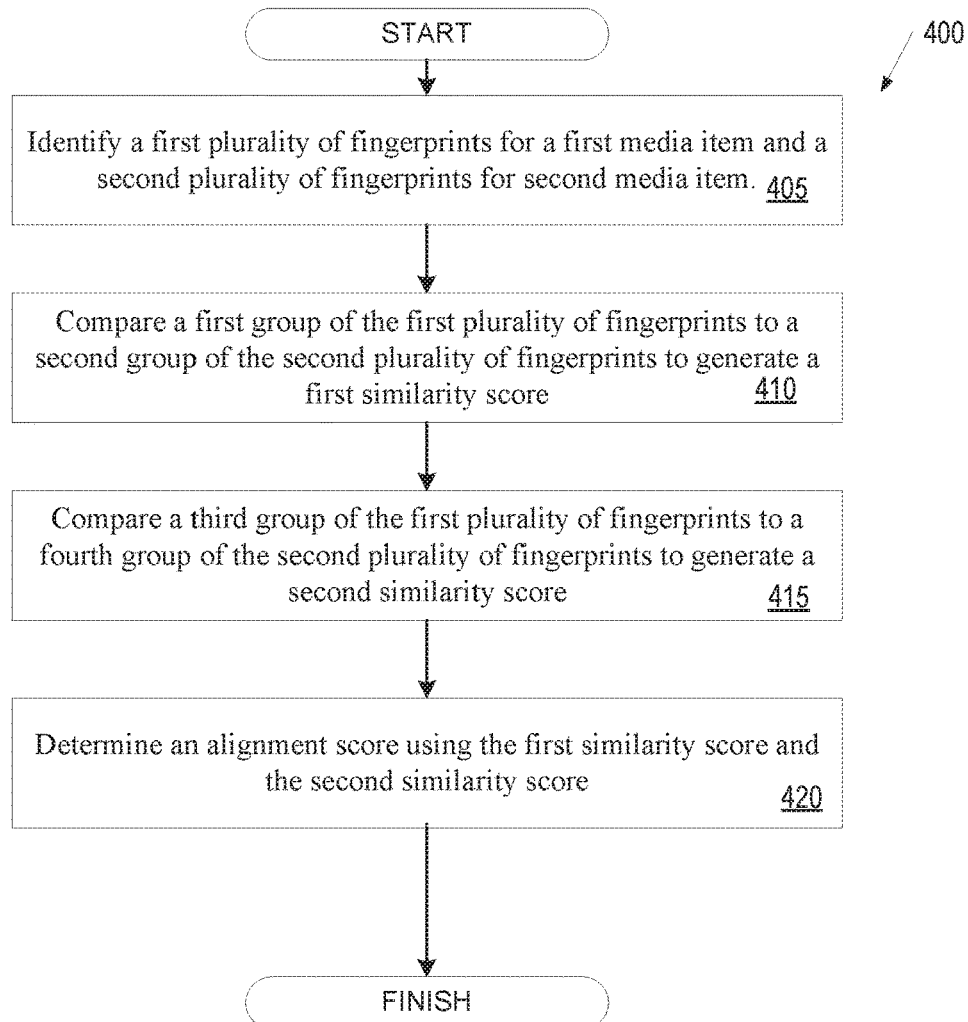
FIG. 4 is a flow diagram illustrating a method for determining similarities between media items using multi-step sequence alignment, in accordance with some implementations.

FIG. 4 is a flow diagram illustrating method 400 for determining similarities between media items using multi-step sequence alignment, in accordance with some implementations. Method 400 may be performed by processing logic that includes hardware (e.g., circuitry, dedicated logic, programmable logic, microcode), software (e.g., instructions run on a processing device to perform hardware simulation), or a combination thereof. In one implementation, multi-step sequence alignment module 140 of server 130 may perform some or all the operations described herein.

Method 400 begins at block 405 where processing logic identifies a first multiplicity of fingerprints representative of content segments of variable duration for a first media item and a second multiplicity of fingerprints representative of content segments of variable duration for a second media item. At block 410, processing logic may compare a first group of the first multiplicity of fingerprints to a second group of the second multiplicity of fingerprints to generate a first similarity score indicative of a similarity between the first group of fingerprints and the second group of fingerprints. The first group of fingerprints includes at least two fingerprints representative of at least two content segments of variable duration for the first media item, and the second group of fingerprints includes at least one fingerprint representative of at least one content segment of variable duration for the second media item. At block 415, processing logic compares a third group of the first multiplicity of fingerprints to a fourth group of the second multiplicity of fingerprints to generate a second similarity score indicative of a similarity between the third group of fingerprints and the fourth group of fingerprints. At block 420, processing logic determines the alignment score using the first similarity score and the second similarity score.

Figure 5:
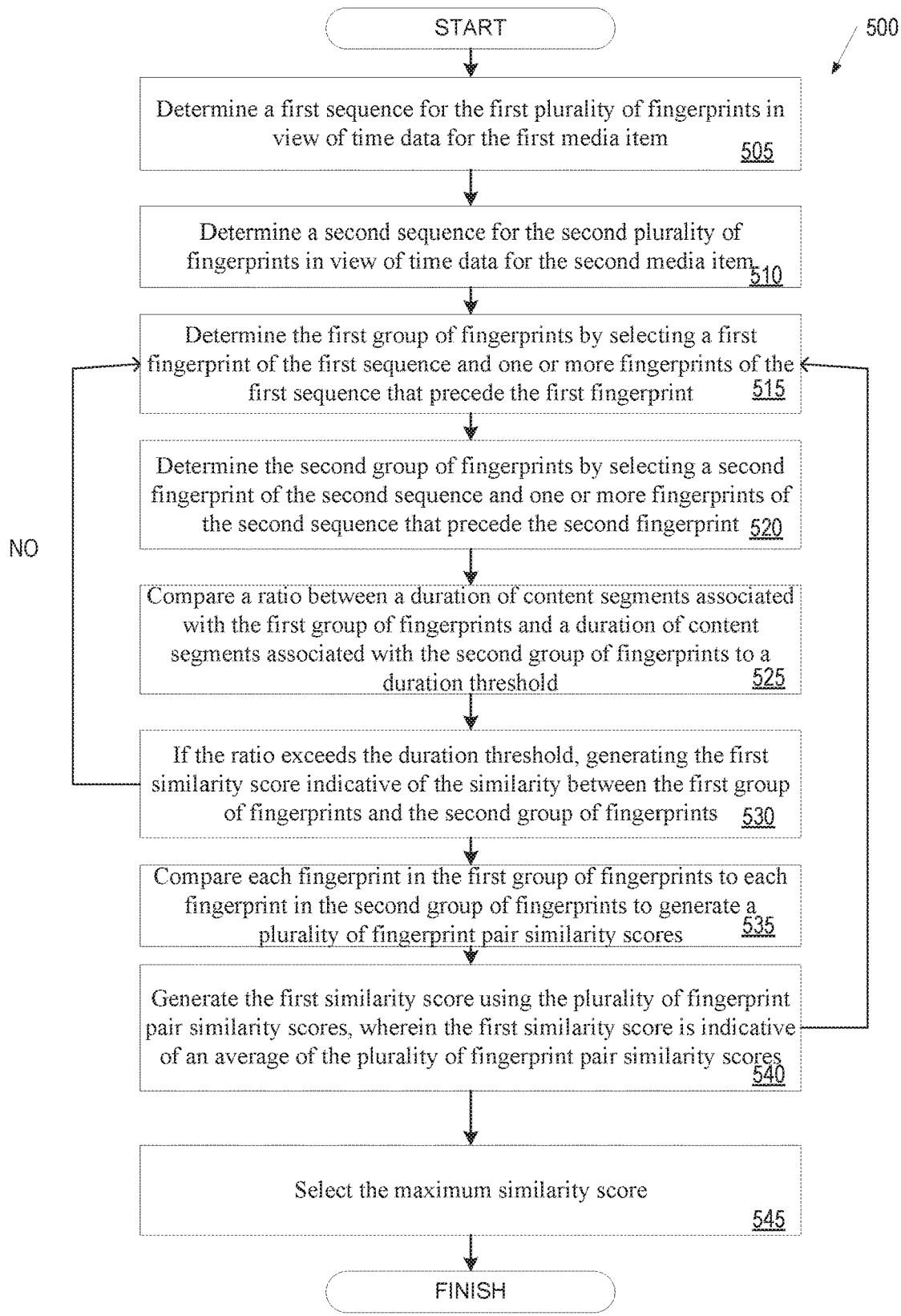
FIG. 5 is a flow diagram illustrating a method for determining similarity between groups of fingerprints representative of content segments of variable duration, in accordance with some implementations.

FIG. 5 is a flow diagram illustrating a method for determining similarity between groups of fingerprints representative of content segments of variable duration, in accordance with some implementations. Method 500 may be performed by processing logic that includes hardware (e.g., circuitry, dedicated logic, programmable logic, microcode), software (e.g., instructions run on a processing device to perform hardware simulation), or a combination thereof. In one implementation, multi-step sequence alignment module 140 of server 130 may perform some or all the operations described herein. Method 500 may describe operations to compare a first group of the first plurality of fingerprints to a second group of the second plurality of fingerprints to generate a first similarity score indicative of a similarity between the first group of fingerprints and the second group of fingerprints. In some implementations, method 500 may represent operation of block 410 or block 415 of method 400 described with respect to FIG. 4.

Method 500 begins at block 505 where processing logic determines a first sequence for the first multiplicity of fingerprints in view of time data for the first media item. At block 510, processing logic determines a second sequence for the second multiplicity of fingerprints in view of time data for the second media item. At block 515, processing logic determines the first group of fingerprints by selecting a first fingerprint of the first sequence and one or more fingerprints of the first sequence that precede the first fingerprint in the first sequence. At block 520, processing logic determines the second group of fingerprints by selecting a second fingerprint of the second sequence and one or more fingerprints of the second sequence that precede the second fingerprint in the second sequence. At block 525, processing logic compares a ratio between a duration of content segments associated with the first group of fingerprints and a duration of content segments associated with the second group of fingerprints to a duration threshold. At block 530, if the ratio exceeds the duration threshold, processing logic generates the first similarity score indicative of the similarity between the first group of fingerprints and the second group of fingerprints. If the ratio does not exceed the duration threshold, processing logic may return to block 515. It may be noted that processing logic may return to block 515 to recursively define additional groups for a particular matrix position, where the groups have different combinations of fingerprints. It also may be noted that operations described herein, such as determining similarity scores for the different combination of groups, may be performed in parallel or in series, for example. Defining additional groups for a particular matrix position is further described at least with respect to FIG. 2 and FIG. 3D-3E.

If the ratio exceeds the duration threshold at block 530, processing logic proceed to block 535. At block 535, processing logic compares each fingerprint in the first group of fingerprints to each fingerprint in the second group of fingerprints to generate a multiplicity of fingerprint pair similarity scores. At block 540, processing logic generates the first similarity score using the multiplicity of fingerprint pair similarity scores. The first similarity score is indicative of an average of the plurality of fingerprint pair similarity scores. At block 540, processing logic may return to block 515 to recursively define additional groups for a particular matrix position. Processing logic may return to block 515 from block 540 until all the groups have been reclusively defined. The recursively defined groups that exceed the duration threshold will be used to generate additional similarity scores (e.g., block 540). Once all the recursively defined groups have been defined and the additional similarity scores are generated, processing logic may proceed to block 545. At block 545, processing logic selects the maximum similarity score for a particular matrix position. Method 500 may be repeated for each matrix position as described at least with respect to FIG. 2 and FIG. 3B-3F.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be noted that the processes disclosed in this specification are capable of being stored on an article of manufacture to facilitate transporting and transferring such processes to computing devices. The term "article of manufacture," as used herein, is intended to encompass a computer program accessible from a non-transitory computer-readable device or storage media.

Figure 6:
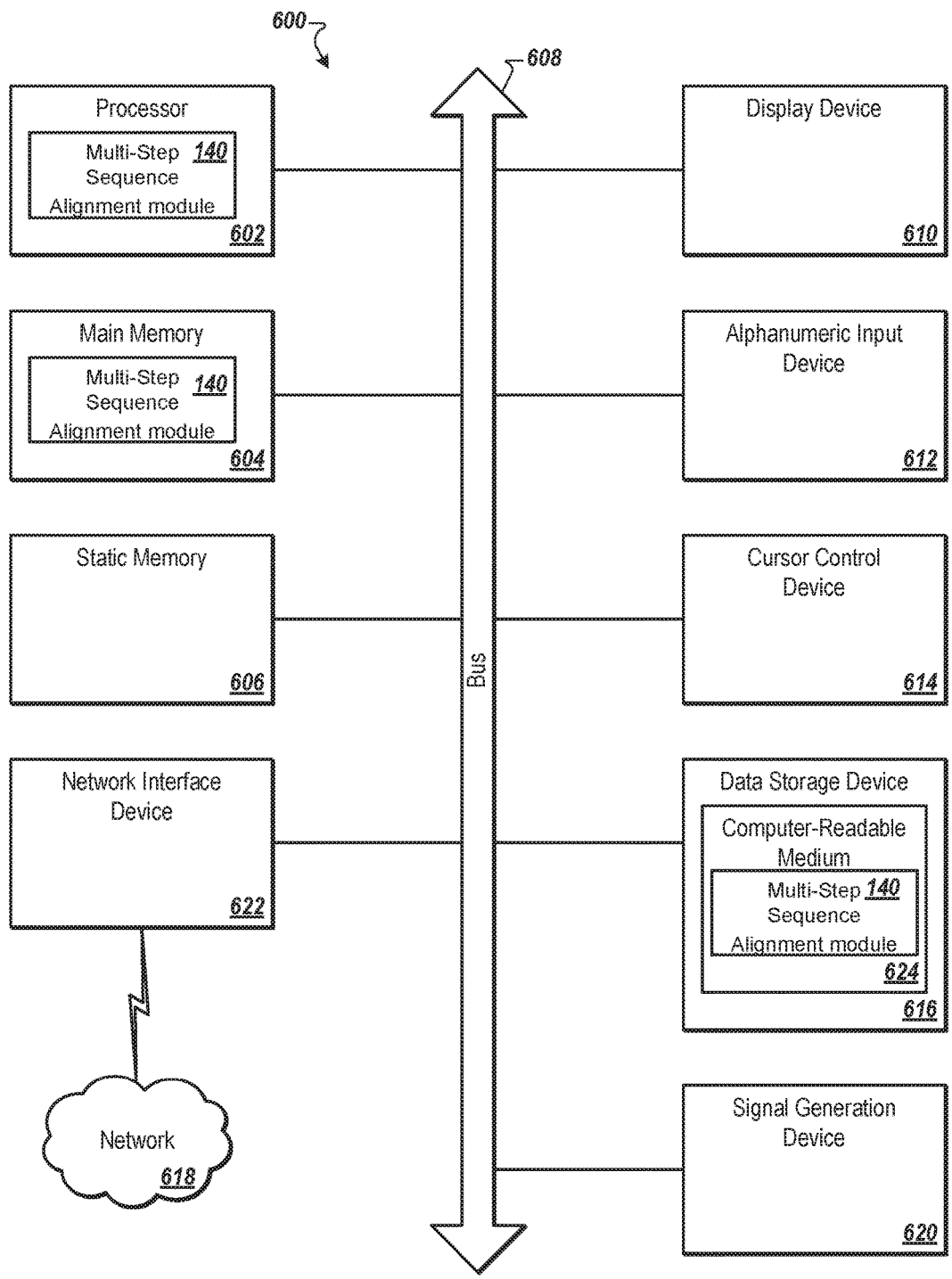
FIG. 6 is a block diagram illustrating an exemplary computer system, according to some implementations.

FIG. 6 is a block diagram illustrating an exemplary computer system 600. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of multi-step sequence alignment module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and the multi-step sequence alignment module 140 for performing the operations and steps discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and multi-step sequence alignment module 140 embodying any one or more of the methodologies or functions described herein. The sets of instructions of the system architecture 100 and multi-step sequence alignment module 140 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "comparing", "determining", "generating", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

We claim:

1. A method comprising:
    identifying first fingerprints representative of content segments of variable duration for a first media item and second fingerprints representative of content segments of variable duration for a second media item;
    comparing, by a processing device, a first group of the first fingerprints to a second group of the second fingerprints to generate a first similarity score indicative of a similarity between the first group of fingerprints and the second group of fingerprints, wherein the first group of fingerprints comprises at least two fingerprints representative of at least two content segments of variable duration of the first media item, and the second group of fingerprints comprises at least one fingerprint representative of at least one content segment of variable duration of the second media item; and
    determining an alignment score for the first fingerprints and the second fingerprints using the first similarity score, wherein the alignment score is indicative of a probability that the first media item is similar to the second media item.

2. The method of claim 1, wherein the first media item is a first video item, and wherein the second media item is a second video item.

3. The method of claim 1, further comprising:
    comparing a third group of the first fingerprints of the first media item to a fourth group of the second fingerprints of the second media item to generate a second similarity score indicative of a similarity between the third group of fingerprints and the fourth group of fingerprints, wherein the alignment score is determined using the first similarity score and the second similarity score.

4. The method of claim 1, wherein comparing the first group of the first fingerprints to the second group of the second fingerprints comprises:
    determining a first sequence for the first fingerprints in view of time data for the first media item;
    determining a second sequence for the second fingerprints in view of time data for the second media item; and
    determining the first group of fingerprints by selecting a first fingerprint of the first sequence and one or more fingerprints of the first sequence that precede the first fingerprint in the first sequence.

5. The method of claim 4, wherein comparing the first group of the first fingerprints to the second group of the second fingerprints comprises:
    determining the second group of fingerprints by selecting a second fingerprint of the second sequence and one or more fingerprints of the second sequence that precede the second fingerprint in the second sequence.

6. The method of claim 1, wherein comparing the first group of the first fingerprints to the second group of the second fingerprints comprises:
    comparing a ratio between a duration of content segments associated with the first group of fingerprints and a duration of content segments associated with the second group of fingerprints to a duration threshold;
    responsive to the ratio exceeding the duration threshold, generating the first similarity score indicative of the similarity between the first group of fingerprints and the second group of fingerprints; and
    responsive to the ratio not exceeding the duration threshold, refraining from generating the first similarity score indicative of the similarity between the first group of fingerprints and the second group of fingerprints.

7. The method of claim 1, wherein comparing the first group of the first fingerprints to the second group of the second fingerprints comprises:

comparing each fingerprint in the first group of fingerprints to each fingerprint in the second group of fingerprints to generate a plurality of fingerprint pair similarity scores; and
generating the first similarity score using the plurality of fingerprint pair similarity scores, wherein the first similarity score is an average of the plurality of fingerprint pair similarity scores.

8. A system comprising:
a memory; and
a processing device, coupled to the memory, to:
identify first fingerprints representative of content segments of variable duration for a first media item and second fingerprints representative of content segments of variable duration for a second media item;
compare a first group of the first fingerprints to a second group of the second fingerprints to generate a first similarity score indicative of a similarity between the first group of fingerprints and the second group of fingerprints, wherein the first group of fingerprints comprises at least two fingerprints representative of at least two content segments of variable duration of the first media item, and the second group of fingerprints comprises at least one fingerprint representative of at least one content segment of variable duration of the second media item; and
determine an alignment score for the first fingerprints and the second fingerprints using the first similarity score, wherein the alignment score is indicative of a probability that the first media item is similar to the second media item.

9. The system of claim 8, wherein the first media item is a first video item, and wherein the second media item is a second video item.

10. The system of claim 8, the processing device further to:
compare a third group of the first fingerprints of the first media item to a fourth group of the second fingerprints of the second media item to generate a second similarity score indicative of a similarity between the third group of fingerprints and the fourth group of fingerprints wherein the alignment score is determined using the first similarity score and the second similarity score.

11. The system of claim 8, wherein to compare the first group of the first fingerprints to the second group of the second fingerprints, the processing device to:
determine a first sequence for the first fingerprints in view of time data for the first media item;
determine a second sequence for the second fingerprints in view of time data for the second media item; and
determine the first group of fingerprints by selecting a first fingerprint of the first sequence and one or more fingerprints of the first sequence that precede the first fingerprint in the first sequence.

12. The system of claim 11, wherein to compare the first group of the first fingerprints to the second group of the second fingerprints, the processing device further to:
determine the second group of fingerprints by selecting a second fingerprint of the second sequence and one or more fingerprints of the second sequence that precede the second fingerprint in the second sequence.

13. The system of claim 8, wherein to compare the first group of the first fingerprints to the second group of the second fingerprints, the processing device to:
compare a ratio between a duration of content segments associated with the first group of fingerprints and a duration of content segments associated with the second group of fingerprints to a duration threshold;
responsive to the ratio exceeding the duration threshold, generate the first similarity score indicative of the similarity between the first group of fingerprints and the second group of fingerprints; and
responsive to the ratio not exceeding the duration threshold, refrain from generating the first similarity score indicative of the similarity between the first group of fingerprints and the second group of fingerprints.

14. The system of claim 8, wherein to compare the first group of the first fingerprints to the second group of the second fingerprints, the processing device further to:
compare each fingerprint in the first group of fingerprints to each fingerprint in the second group of fingerprints to generate a plurality of fingerprint pair similarity scores; and
generate the first similarity score using the plurality of fingerprint pair similarity scores, wherein the first similarity score is an average of the plurality of fingerprint pair similarity scores.

15. A non-transitory computer readable medium that stores instruction that, responsive to being executed by a processing device, cause the processing device to perform operations comprising:
identifying first fingerprints representative of content segments of variable duration for a first media item and second fingerprints representative of content segments of variable duration for a second media item;
comparing, by the processing device, a first group of the first fingerprints to a second group of the second fingerprints to generate a first similarity score indicative of a similarity between the first group of fingerprints and the second group of fingerprints, wherein the first group of fingerprints comprises at least two fingerprints representative of at least two content segments of variable duration of the first media item, and the second group of fingerprints comprises at least one fingerprint representative of at least one content segment of variable duration of the second media item; and
determining an alignment score for the first fingerprints and the second fingerprints using the first similarity score, wherein the alignment score is indicative of a probability that the first media item is similar to the second media item.

16. The non-transitory computer readable medium of claim 15, wherein the first media item is a first video item, and wherein the second media item is a second video item.

17. The non-transitory computer readable medium of claim 15, the operations further comprising:
comparing a third group of the first fingerprints of the first media item to a fourth group of the second fingerprints of the second media item to generate a second similarity score indicative of a similarity between the third group of fingerprints and the fourth group of fingerprints, wherein the alignment score is determined using the first similarity score and the second similarity score.

18. The non-transitory computer readable medium of claim 15, wherein comparing the first group of the first fingerprints to the second group of the second fingerprints, the operations comprising:
determining a first sequence for the first fingerprints in view of time data for the first media item;
determining a second sequence for the second fingerprints in view of time data for the second media item;
determining the first group of fingerprints by selecting a first fingerprint of the first sequence and one or more fingerprints of the first sequence that precede the first fingerprint in the first sequence; and determining the second group of fingerprints by selecting a second fingerprint of the second sequence and one or more fingerprints of the second sequence that precede the second fingerprint in the second sequence.

19. The non-transitory computer readable medium of claim 15, wherein comparing the first group of the first fingerprints to the second group of the second fingerprints, the operations comprising:

comparing a ratio between a duration of content segments associated with the first group of fingerprints and a duration of content segments associated with the second group of fingerprints to a duration threshold;

responsive to the ratio exceeding the duration threshold, generating the first similarity score indicative of the similarity between the first group of fingerprints and the second group of fingerprints; and responsive to the ratio not exceeding the duration threshold, refraining from generating the first similarity score indicative of the similarity between the first group of fingerprints and the second group of fingerprints.

20. The non-transitory computer readable medium of claim 15, wherein comparing the first group of the first fingerprints to the second group of the second fingerprints, the operations comprising:

comparing each fingerprint in the first group of fingerprints to each fingerprint in the second group of fingerprints to generate a plurality of fingerprint pair similarity scores; and generating the first similarity score using the plurality of fingerprint pair similarity scores, wherein the first similarity score is an average of the plurality of fingerprint pair similarity scores.

* * * * *